United States Patent Office 2,868,635
Patented Jan. 13, 1959

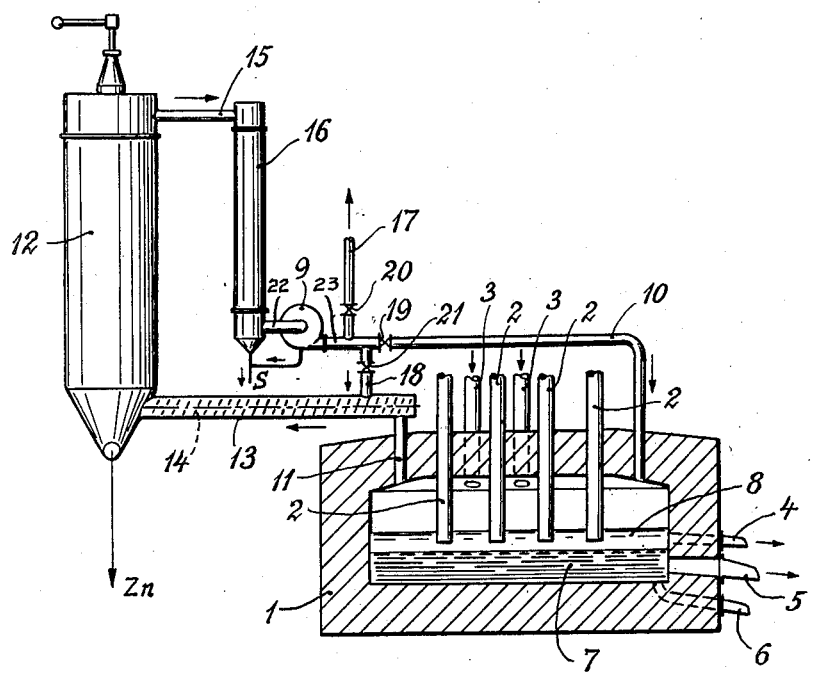

2,868,635

METHOD OF TREATING IRON SULFIDE-CONTAINING ORE OR CONCENTRATES

Sigurd Arthur Aannerud and Eigil Mostad, Thamshavn, Norway, assignors to Pyror Limited, Hamilton, Bermuda, a Bermudian company Application December 27, 1956, Serial No. 630,924

Claims priority, application Norway January 2, 1956

9 Claims. (Cl. 75—23)

The present invention relates to a process for the treatment of iron sulfide-containing material.

According to the invention it was found that by melting iron sulfide-containing material such as iron pyrite or other iron sulfide-containing ores or concentrates in mixture with iron oxide-containing material in a closed electrode furnace, it is possible to remove substantially all silica, gangue etc., which may be present in one or both of said materials, in the form of a slag, whereas the main part of the iron present in the aforesaid materials, together with the main part of other metals which may be present in the materials in the form of sulfide compounds, will be converted partly to FeS and partly to FeO, in the form of a matte which is highly reactive and excellently suited, after cooling to a suitable temperature and crushing the same, to be subjected to further treatment by leaching for example with diluted sulfuric acid.

Of the other metals mentioned above, copper and cobalt that may be present in the materials will be included in the matte. Zinc will be partly introduced into the matte and partly evaporate so that it can be recovered from the escaping gases; the same applies to sulfur vapor and the gaseous sulfur compounds formed.

It may be convenient to use as the iron oxide-containing material to be admixed to the ore fayalite slag or other slag obtained from the smelting of oxidizing ore or copper concentrate, whereby it is possible, concurrently with the initial step of the treatment of ore or concentrate, to recover the valuable components of these slags as useful products. Formerly these slags have been almost worthless. In the process according to the invention, the oxygen content of higher oxides in the slag is reduced with sulfide to FeO, which joins the matte, and which, according to the literature, forms a eutectic mixture with FeS having a eutectic point at 940° C. and a FeO content of about 42 percent.

The reactions occurring in the process according to the invention when using iron pyrite are believed to be substantially as follows:

$$FeS_2 \rightarrow FeS + S$$
$$3Fe_3O_4 + FeS \rightarrow 10FeO + SO_2$$
$$2Fe_3O_4 + S \rightarrow 6FeO + SO_2$$
$$2FeO + 3S \rightarrow 2FeS + SO_2$$

If, on the hand, magnet ore $Fe_7S_8$ is treated instead of iron pyrite, less FeO will be converted into FeS by the above mentioned reaction $2FeO + 3S \rightarrow 2FeS + SO_2$.

When using Orkla fayalite slag a considerable part of the FeO passing into the matte will of course originate from the fayalite $2FeO.SiO_2$ and from the hedenbergite $CaO.FeO.2SiO_2$ contained in the fayalite slag.

On the whole, dependent on the composition of the starting materials, the mixture ratio may vary somewhat so as to obtain the most favorable results.

When mixing Orkla ore with Orkla fayalite slag, the ratio 6:5 has been found to be suitable.

The slag formed, which substantially consists of silica and some iron and eventually of alkaline earth metal oxides, was found to have an electrical conductivity well suited for the electric melting process; however, care must be taken that the electrodes do not project into the highly conductive matte.

From the reactions recited above it will be apparent that sulfur vapor and $SO_2$ are developed. In addition, when using common graphite electrodes, reactions occur between the electrode carbon and the oxygen of the slag so as to form CO, which in turn is in part combined with sulfur to COS and $CS_2$, the latter two compounds being able to react with $SO_2$ to form $CO_2$ and S.

In order to cover the sulfur vapors, the resultant gas is circulated through a suitable cooler, but, due to the formation of the aforesaid gaseous sulfur compounds, the gas volume will constantly increase so that the excess volume must be permitted to escape from the system.

Thereby, a definite composition of the circulating gas will be gradually attained, the gas containing in addition to the sulfur vapor mainly $CO_2$, CO, COS and $CS_2$; furthermore $H_2S$ may be present which is formed due to the presence of moisture from the ores or slag, and of nitrogen from the air entering with the charge.

If oxygen were admitted, this gas mixture would be explosive and might cause destruction due to ignition occurring, for instance, in an electric filter used for the removal of zinc dust; it is, therefore, convenient to maintain an excess pressure above atmospheric in the whole system.

The matte obtained as the main product of the process may for example be leached with diluted sulfuric acid in counter current to the movement of the matte, and the further steps of a treatment as described in Patent 2,653,905, of a calcination product described therein, which treatment includes the further steps of electrolytic recovery of iron from the ferrous sulfide solution, roasting of the residue with oxygen from the electrolysis and catalytic production of sulfur from $H_2S + SO_2$. It has been found that in this connection the selective dissolution of the iron from the matte can be carried up to 95 percent, and since, in addition, the residue is practically free from silica and gangue, the treatment of the residue will in this case be considerably simpler than U. S. patent supra, and require less oxygen so that more oxygen is left available for a partial combustion of $H_2S$. The sulfur contact from the sulfur compounds in the gas released from the circulating mixture, as mentioned above, can easily be recovered by burning the gas with a controlled quantity of air or oxygen in the presence of a catalyst, but where a catalyst is used anyhow for the recovery of sulfur from the leaching step, these steps may be conveniently combined.

As an example of carrying out the process according to the invention, the melting of a copper-containing Orkla ore with Orkla fayalite slag shall be described.

| Ore analysis: | Fayalite slag analysis: |
|---|---|
| About 38.0% Fe | 42.0% Fe |
| 41.6% S | 2.8% S |
| 2.1% Cu | 33.0% $SiO_2$ |
| 2.0% Zn | 0.35% Cu |
| 0.1% Co | 1.9% Zn |
| 10–16% $SiO_2$ | 0.04% Co |
| Rest CaO, MgO | 4.23% CaO |
|  | 1.47% $Al_2O_3$ |
|  | 0.44% MgO |
|  | Rest oxygen |

From 600 kgs. of ore and 500 kgs. of slag about 620 kgs. of a matte was obtained. The difference of weights is made up by slag, sulfur-containing gases expelled from the reaction, and evaporated zinc.

The resulting products showed the following analytical composition:

Matte from electric melting:
- 61.5% Fe
- 29.2% S
- 2.78% Cu
- 2.0% Zn
- 0.13% Co
- 0.5% undissolved
- Rest oxygen Slag from electric melting:
- 21% Fe
- 53% $SiO_2$
- 6% CaO
- 2.5% MgO
- 0.02% Cu
- 0% Co
- Rest mainly oxygen While the iron compounds contained in the mattes of some known processes such as that of Patent 1,593,509 to Smaill contain the same in an insoluble form similar to that of magnetite $Fe_7S_8$, which latter compound may be used as a component in the starting material of the present process, the iron-sulfur compound contained in the matte obtained by the process according to the invention is an unstable, highly reactive iron-sulfur compound having less than 8 sulfur equivalents per each 7 iron equivalents, and corresponding to a formula $Fe_7S_{6.15}$, as can easily be calculated from the above ratio of iron to sulfur in the matte.

The melting process according to the invention is illustrated in the drawing in which an apparatus for carrying out the process is shown by way of example. In the drawing, reference numeral 1 designates an elongated closed furnace of refractory material, in which the electrodes 2 are arranged in the usual manner so as to project downwards through the roof and may be provided with means (not shown) for sealing the furnace, for the vertical adjustment of the same and similar operations. The feeding of material containing iron sulfide and material containing iron oxide into furnace 1 takes place from above as indicated by the feed pipes 3. At its front end wall, the furnace has an upper outlet 4 for the slag 8 and a lower outlet 5 for the matte 7 and, if desired, a separate outlet 6 may be provided for drawing off material from the furnace bottom. The furnace is heated by means of the electrodes 2 to about 1400° C., whereby the matte 7 is obtained as a bottom layer and the slag 8 as an upper layer, care being taken that the electrodes 2 project downwards into the slag 8 by a suitable distance for obtaining desired resistance conditions and hence temperature conditions. Feeding and discharge of furnace 1 may take place continuously so that substantially constant levels are maintained for the slag surface and for the interface of slag and matte in the furnace interior. After suitable cooling and crushing the discharged matte, the latter may then be leached for example with diluted sulfuric acid and be further treated for recovery of the individual valuable components thereof as stated above.

As mentioned above, the melting takes place under an atmosphere of gas, which is circulated by means of a fan 9 and enters the furnace through a conduit 10 at a temperature of about 130° C. From the gas outlet 11 of the furnace, the gas passes through an electric filter 12 (Cottrell filter) through a conduit 13 provided with a feeding screw 14 for transporting dust, which may deposite on the wall, forwards to the bottom of the filter. The gases enter the bottom of the filter at a temperature of about 500° C., and are cleared electrostatically from zinc dust which is removed at the bottom through outlet Zn. The gases then escape from the top of the filter at a temperature of about 400° C. through the conduit 15 to a cooler 16 in which they are cooled down to about 130° C. whereby sulfur is condensed and thereby separated. From the cooler 16 the de-sulfurized gases are returned to the fan 9 through conduit 22.

Behind the fan, the section 23 of gas conduit 10 is branched into the main conduit 10, a gas discharge conduit 17 and a by-pass conduit 18 passing directly to the conduit 13. Each of these conduits is provided with valves 19, 20 and 21 respectively, of which the valve 20 is kept sufficiently throttled so that excess pressure is constantly maintained in the whole system, and the valve 21 is so adjusted with respect to the valve 19 that the temperature at the inlet of the filter is kept at the desired value of about 500° C. Residual sulfur, if any, which may condense in the fan 9, is removed from the system together with the liquid sulfur from the bottom of cooler 16 through outlet S.

We claim:

1. A method for the treatment of iron pyrite or other iron-sulfide containing ores or concentrates, comprising the steps of (1) preparing a mixture of iron-sulfide containing material and of iron-oxide containing material without addition of fluxes, and (2) heating the mixture to melting in a closed electrode furnace under the exclusion of oxygen from the outside so as to form (a) a slag in which silica and gangue are included together with a smaller amount of iron, and (b) a matter which contains the major portion of the iron from said mixture, partly as an iron sulfide containing less than 8 gram equivalents of sulfur per every 7 gram equivalents of iron and partly as ferrous oxide, FeO, which iron compounds form at least a major portion of said matte, said matte being obtained in a reactive form, from which the major portion of the iron content thereof can be dissolved selectively by leaching the matte with diluted sulfuric acid after crushing the same.

2. A method as claimed in claim 1, characterized in that the iron oxide-containing material is a slag resulting from an oxidizing smelting of iron ore concentrate.

3. A method as claimed in claim 2, characterized by the use of fayalite slag obtained by an oxidizing smelting of copper-containing ore as the iron oxide-containing material.

4. A method as claimed in claim 3, characterized in that the heating step is carried out under an atmosphere of circulating gas under excess pressure above atmospheric.

5. A method for the treatment of iron pyrite or other iron-sulfide containing ores or concentrates, comprising the steps of (1) preparing a mixture of iron-sulfide containing material and of iron-oxide containing material without addition of fluxes, (2) heating the mixture to melting in a closed electrode furnace under the exclusion of oxygen from the outside so as to form (a) a slag in which silica and gangue are included together with a smaller amount of iron, and (b) a matte which contains the major portion of the iron from said mixture, partly as an iron sulfide containing less than 8 gram equivalents of sulfur per every 7 gram equivalents of iron and partly as ferrous oxide, FeO, which iron compounds form at least a major portion of said matte, said matte being obtained in a reactive form, from which the major portion of the iron content thereof can be dissolved selectively by leaching the matte with diluted sulfuric acid after crushing the same, and (3) recovering sulfur from the gases containing the same, which escape during the heating step.

6. A method for the treatment of iron pyrite or other iron sulfide-containing ores or concentrates, which starting materials have a content of copper and cobalt, characterized by the steps of (1) preparing a mixture of iron-sulfide containing material and of iron-oxide material without addition of fluxes, (2) heating the mixture to melting in a closed electrode furnace under the exclusion of oxygen from the outside so as to form (a) a slag in which silica and gangue are included together with a smaller amount of iron, and (b) a matte which contains the major portion of the iron from said mixture, partly as an iron sulfide containing less than 8 gram equivalents of sulfur per each 7 gram equivalents of iron and partly as ferrous oxide, FeO, which iron compounds form at least a major portion of said matte, and most of the copper and cobalt content from said mixture.

7. A method for the treatment of iron pyrite or other iron sulfide-containing ores or concentrates, which starting materials have a content of zinc, characterized by the steps of (1) preparing a mixture of iron-sulfide containing material and of iron-oxide material without addition of fluxes, (2) heating the mixture to melting in a closed electrode furnace under the exclusion of oxygen from the outside so as to form (a) a slag in which silica and gangue are included together with a smaller amount of iron, and (b) a matte which contains the major portion of the iron from said mixture, partly as an iron sulfide containing less than 8 gram equivalents of sulfur per each 7 gram equivalents of iron and partly as ferrous oxide, FeO, which iron compounds form at least a major portion of said matte, and part of the zinc content, the other part of the latter metal escaping together with the sulfur-containing vapors during the heating of the mixture, said matte being obtained in a reactive form, from which the major portion of the iron content thereof can be dissolved selectively by leaching the matte with diluted sulfuric acid after crushing the same, and (3) recovering sulfur and zinc from the gases containing the same, which escape during the heating step.

8. A process of treating an iron sulfide-containing material and an iron oxide- and silica-containing material, at least one of which materials also contains other metals including copper, cobalt and zinc, comprising the steps of (1) preparing a mixture of iron-sulfide containing material and of iron-oxide containing material without addition of fluxes, in such proportions relative to each other as to obtain a slag containing silica and a minor portion of iron (2) heating the mixture to melting in a closed electrode furnace under the exclusion of oxygen from the outside so as to form (a) a slag in which silica and gangue are included together with a smaller amount of iron, and (b) a matte which contains the major portion of the iron and from said mixture, partly as an iron sulfide containing less than 8 gram equivalents of sulfur per each 7 gram equivalents of iron and partly as ferrous oxide, FeO, which iron compounds form at least a major portion of said matte, and most of the copper and cobalt content and part of the zinc content from said mixture, the other part of the zinc content thereof escaping together with the sulfur-containing vapors during the heating of the mixture, said matte being obtained in a reactive form, from which the major portion of the iron content thereof can be dissolved selectively by leaching the matte with diluted sulfuric acid after crushing the same, and (3) recovering sulfur and zinc from the gases containing the same, which escape during the heating step.

9. A matte obtained by the treatment of iron pyrite or other sulfide-containing ores or concentrates, at least the major portion of which consists of iron compounds partly in the form of an iron sulfide containing less than 8 gram equivalents of sulfur per each 7 gram equivalents of iron, and partly in the form of ferrous oxide, FeO, said iron compounds constituting a eutectic mixture having a eutectic point at 940° C. and an FeO content of about 42%, said matte being in a reactive form, from which the major portion of the iron content thereof can be dissolved selectively by leaching the matte with diluted sulfuric acid after crushing the same.

References Cited in the file of this patent

UNITED STATES PATENTS

| | | |
|---|---|---|
| 1,024,629 | Halvorsen | Apr. 30, 1912 |
| 1,593,509 | Smaill | July 20, 1926 |
| 2,653,905 | Aannerud | Sept. 29, 1953 |

FOREIGN PATENTS

| | | |
|---|---|---|
| 396,690 | Great Britain | July 31, 1933 |